(12) United States Patent
Masinter et al.

(10) Patent No.: US 9,697,229 B2
(45) Date of Patent: Jul. 4, 2017

(54) METHODS AND SYSTEMS FOR CREATING AND STORING METADATA

(75) Inventors: Larry Melvin Masinter, Los Altos, CA (US); Stephen Arnulf Deach, Fremont, CA (US); David P. Simons, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 2215 days.

(21) Appl. No.: 12/129,190

(22) Filed: May 29, 2008

(65) Prior Publication Data

US 2014/0304215 A1 Oct. 9, 2014

Related U.S. Application Data

(60) Provisional application No. 61/044,212, filed on Apr. 11, 2008.

(51) Int. Cl.
*G06F 17/30* (2006.01)

(52) U.S. Cl.
CPC ................. *G06F 17/3023* (2013.01)

(58) Field of Classification Search
CPC .................................. G06F 17/3023
USPC .......... 707/705, 913, 601; 715/200
See application file for complete search history.

(56) References Cited

U.S. PATENT DOCUMENTS

| | | | |
|---|---|---|---|
| 5,897,636 A * | 4/1999 | Kaeser | |
| 6,327,584 B1 * | 12/2001 | Xian et al. | |
| 6,353,926 B1 * | 3/2002 | Parthesarathy | G06F 8/65 707/999.202 |
| 6,738,075 B1 * | 5/2004 | Torres et al. | 715/723 |
| 7,158,991 B2 * | 1/2007 | Kekre et al. | |
| 7,287,222 B2 * | 10/2007 | Takata et al. | 715/210 |
| 7,580,957 B2 * | 8/2009 | Azami | |
| 7,620,624 B2 * | 11/2009 | Stata et al. | |
| 7,624,337 B2 * | 11/2009 | Sull et al. | 715/201 |
| 7,711,708 B2 * | 5/2010 | Bergstraesser et al. | 707/638 |
| 7,836,019 B2 * | 11/2010 | Barker et al. | 707/638 |
| 2003/0123696 A1 * | 7/2003 | Matsumoto et al. | 382/100 |
| 2005/0154763 A1 * | 7/2005 | van Beek et al. | 707/104.1 |
| 2005/0168453 A1 * | 8/2005 | Ueda | 345/204 |

(Continued)

*Primary Examiner* — James Trujillo
*Assistant Examiner* — Jessica N Le
(74) *Attorney, Agent, or Firm* — Kilpatrick Townsend & Stockton LLP

(57) ABSTRACT

One embodiment of the present disclosure is a method of creating metadata during object development. The method comprises receiving a change to an object during its development that results in a changed version of the object, identifying information about the change, and creating metadata comprising the information about the change. The information about the change may include a unique instance identifier identifying and unique to the changed version of the object. As an object is changed multiple times during development, the created metadata may include a series of information segments each relating to a particular change and each uniquely identified by its unique instance identifier. The information about the change may also include, as examples, an identification of a unique instance identifier of a prior version of the object, the time of the change to the object, and/or identification of the software used to make the change. Other embodiments relate to compound objects, part mapping, and modification of ingredients, among other things.

21 Claims, 7 Drawing Sheets

(56) References Cited

U.S. PATENT DOCUMENTS

| | | | |
|---|---|---|---|
| 2005/0223037 A1* | 10/2005 | Ahn et al. | 707/104.1 |
| 2005/0234858 A1* | 10/2005 | Torii et al. | 707/1 |
| 2005/0273779 A1* | 12/2005 | Cheng et al. | 717/168 |
| 2006/0161602 A1* | 7/2006 | Barrs et al. | 707/203 |
| 2006/0161867 A1* | 7/2006 | Drucker et al. | 715/810 |
| 2006/0206541 A1* | 9/2006 | Shimogori et al. | 707/203 |
| 2006/0244845 A1 | 11/2006 | Craig et al. | |
| 2007/0136662 A1* | 6/2007 | Khaba | 715/530 |
| 2007/0168672 A1* | 7/2007 | Izu et al. | 713/176 |
| 2007/0233740 A1* | 10/2007 | Nichols et al. | 707/104.1 |
| 2007/0250532 A1* | 10/2007 | Beato et al. | 707/103 R |
| 2008/0013916 A1* | 1/2008 | Sharpe et al. | 386/52 |
| 2008/0108025 A1* | 5/2008 | Menell | 434/118 |
| 2008/0137688 A1* | 6/2008 | Walsh | 370/498 |
| 2008/0307363 A1* | 12/2008 | Jalon et al. | 715/835 |
| 2009/0049009 A1* | 2/2009 | Valentin | G06F 17/30525 |
| 2009/0103835 A1* | 4/2009 | Folgner et al. | 382/299 |
| 2009/0187610 A1* | 7/2009 | Guo | G06F 17/3028 |
| 2009/0282060 A1* | 11/2009 | Paulussen | G06F 17/3002 |
| 2010/0242033 A1* | 9/2010 | Fritsch et al. | 717/171 |
| 2015/0293672 A1* | 10/2015 | Crotty | G06T 11/60 715/255 |

\* cited by examiner

```
┌─────────────────────────────────────────────┐
│   RECEIVING A CHANGE TO AN OBJECT DURING    │
│         DEVELOPMENT OF THE OBJECT           │
│                                         310 │
└─────────────────────────────────────────────┘
                      │
┌─────────────────────────────────────────────┐
│    IDENTIFYING INFORMATION ABOUT THE CHANGE │
│                                         320 │
└─────────────────────────────────────────────┘
                      │
┌─────────────────────────────────────────────┐
│ CREATING METADATA FOR THE CHANGE TO THE     │
│ OBJECT, THE METADATA COMPRISING THE         │
│ INFORMATION ABOUT THE CHANGE                │
│                                         330 │
└─────────────────────────────────────────────┘
```

FIGURE 3

```
┌─────────────────────────────────────────────┐
│   IDENTIFYING AN INGREDIENT OBJECT OF A     │
│             COMPOUND OBJECT                 │
│                                         410 │
└─────────────────────────────────────────────┘
                      │
┌─────────────────────────────────────────────┐
│ CREATING METADATA COMPRISING INFORMATION    │
│ ABOUT THE INCLUSION OF THE INGREDIENT IN THE│
│             COMPOUND OBJECT                 │
│                                         420 │
└─────────────────────────────────────────────┘
```

FIGURE 4

IDENTIFYING AN INGREDIENT USED IN A COMPOUND OBJECT DURING DEVELOPMENT OF THE COMPOUND OBJECT
510

DETERMINING A PART MAPPING COMPRISING AN IDENTIFICATION OF A PART OF THE INGREDIENT USED AS A PART OF THE COMPOUND OBJECT
520

CREATING METADATA FOR THE COMPOUND OBJECT COMPRISING THE PART MAPPING
530

IDENTIFYING AN INGREDIENT OF A COMPOUND OBJECT DURING DEVELOPMENT OF THE COMPOUND OBJECT
1110

IDENTIFYING METADATA ASSOCIATED WITH THE INGREDIENT
1120

CREATING METADATA FOR THE COMPOUND OBJECT, THE METADATA FOR THE COMPOUND OBJECT COMPRISING THE INFORMATION ABOUT THE INCLUSION OF THE INGREDIENT IN THE COMPOUND OBJECT AND INFORMATION ABOUT THE METADATA ASSOCIATED WITH THE INGREDIENT
1130

FIGURE 11

IDENTIFYING METADATA ASSOCIATED WITH AN INGREDIENT OF A COMPOUND OBJECT DURING DEVELOPMENT OF THE COMPOUND OBJECT
1210

CREATING A UNIQUE INGREDIENT IDENTIFIER FOR INGREDIENT
1220

RECEIVING A MODIFICATION OF THE INGREDIENT AS USED IN THE COMPOUND OBJECT
1230

CREATING COMPOUND OBJECT METADATA COMPRISING (I) INFORMATION ABOUT THE INGREDIENT MODIFICATION AND (II) INFORMATION ABOUT THE INGREDIENT METADATA, WHEREIN THE UNIQUE INGREDIENT IDENTIFIER IS INCLUDED AS PART OF BOTH THE INFORMATION ABOUT THE MODIFICATION AND THE INFORMATION ABOUT THE INGREDIENT METADATA
1240

FIGURE 12

METHODS AND SYSTEMS FOR CREATING AND STORING METADATA

RELATED FIELD

This document claims the benefit of U.S. Provisional Application Ser. No. 61,044,212, entitled "Methods and Systems for Creating and Storing Metadata" and filed Apr. 11, 2008, the entire contents of which are incorporated by this reference.

FIELD

Embodiments of this disclosure relate generally to methods and systems for creating metadata, including metadata related to compound objects and object development.

BACKGROUND

The term "object" refers herein to any file, content, or other electronic or printed item for which metadata can be embedded or otherwise associated. In the past, metadata has been embedded in certain types of objects to provide assertions about the object's data properties. However, such metadata has often been incomplete, particularly for compound objects.

The term "compound object" refers herein to any object which is built out of one or more other objects (i.e., ingredients) and/or pieces of other objects. Many objects are made through a process of assembling other objects (ingredients), together with artistic or creative activity that mixes these together. As examples, a slide show may be constructed using photographs, music, timing and interactivity; a magazine may be constructed from stories, fonts, layout, illustrations, photographs; and a movie may be constructed by combining sound tracks, footage, graphics and special effects. A compound object may be electronic, such an electronic file, or may be a print object, such as a brochure.

The term "ingredient" refers herein to any content or other object incorporated in or used in any other way in a compound object or its development. An ingredient can be virtually any type of content, including, but not limited to, text, images, graphics, documents, data, animation, applications, video, audio, and files, among other things.

With respect to metadata, potentially useful information is often not adequately associated with compound objects. For example, information relating to an object's "ingredients" is often not captured and not included in the object's metadata. Information from the ingredients' own metadata and information about how such ingredients are used may be lost as objects are changed or otherwise manipulated. Using ingredient metadata is also problematic because the assertions within an ingredient's own metadata may or may not apply to the combined object in which it is used. Additional issues may also arise when ingredients are used more than once.

Tracking information in temporal objects presents additional issues. A "temporal" object is any object that has a "time" dimension—including, but not limited to, a video stream, an audio stream, a sequence of events, an interactive object, or an object having any other time component. For example, a video may include a reference pinpointing a particular video time segment. However, when the video-related object is changed or combined with another object, the reference may not apply, since the new object may not have the same time base. Compound objects can combine temporal with non-temporal objects.

SUMMARY

One embodiment of the present disclosure is a method of creating metadata during development of an object. The method comprises receiving a change to an object during its development that results in a changed version of the object, identifying information about the change, and creating metadata comprising the information about the change. The information about the change may include a unique instance identifier identifying and unique to the changed version of the object. As an object is changed multiple times during development, the created metadata may include a series of information segments each relating to a particular change and each uniquely identified by its unique instance identifier. The information about the change may also include, as examples, an identification of a unique instance identifier of a prior version of the object, the time of the change, and/or identification of the software used to make the change.

One embodiment of the present disclosure is a method of creating metadata for a compound object. The method comprises identifying an ingredient of a compound object and creating metadata for the compound object that comprises information about the inclusion of the ingredient in the compound object.

Another embodiment of the present disclosure is a method of creating compound object metadata that includes a part mapping. The method comprises identifying an ingredient of a compound object during development of the compound object, determining a part mapping comprising an identification of a part of the ingredient used as a part of the compound object, and creating metadata for the compound object comprising the part mapping. The method may also comprise partial trimming of metadata based on the part mapping.

Another embodiment of the present disclosure is a method of creating metadata for a compound object that creates metadata for a compound object reflecting metadata from the original ingredients used in the compound object. The method may involve identifying an ingredient used during development of a compound object, identifying metadata associated with the ingredient, and creating metadata for the compound object. The metadata for the compound object may comprise information about the inclusion of the ingredient in the compound object and information about the metadata associated with the ingredient.

Yet another embodiment of the present disclosure is a method of creating metadata for a compound object that includes a modified ingredient. The method comprises identifying metadata associated with an ingredient during development of the compound object, creating a unique ingredient identifier for the ingredient, receiving a modification of the ingredient as used in the compound object, and creating compound object metadata for the compound object. The compound object metadata may comprise information about the modification of the ingredient and information about the metadata associated with the ingredient. The unique ingredient identifier may be included as part of both the information about the modification and the information about the metadata associated with the ingredient.

In other embodiments, a computer-readable medium (such as, for example, random access memory or a computer disk) comprises code for carrying out these methods.

These embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein:

FIG. 3 is a flow chart illustrating a method of creating metadata according to certain embodiments;

FIG. 4 is a flow chart illustrating a method of creating metadata for a compound object according to certain embodiments;

FIG. 11 is a flow chart illustrating a method of creating metadata for a compound object according to certain embodiments; and FIG. 12 is a flow chart illustrating a method of creating metadata for a compound object that includes a modified ingredient according to certain embodiments.

DETAILED DESCRIPTION

Certain embodiments described herein provide methods and systems for creating metadata for objects. Such methods may involve creating metadata relating to the history of an object's development, for example, methods that create or add metadata each time an object is changed. An object's metadata may include an original document identifier and an instance identifier for each change to the object (i.e., for each new version of the object). The metadata for a particular version may include an identification of the object's prior version, the time of the change, the software used to make the change, and/or other information related to the change. Enough information may be recorded to constitute replay parameters that may be used to replay a change. In some cases, for example, where it is not known exactly what was changed, information is recorded that identifies what is known about the change, for example what part of an object changed. For example, it may be recorded that a video clip was changed within a particular time range.

Generally, as an object is developed, metadata may be recorded that identifies anything about how the object is being developed. Such metadata may relate to the ingredients (e.g., previously created documents or portions thereof) used in a compound object and information related to part mapping. An ingredient's part mapping information may identify the source of an ingredient and/or how the ingredient is used. Metadata from an ingredient may be included within the metadata of the compound object in which it is incorporated. When ingredient metadata is included in a compound object, the compound object's other metadata (e.g., a portion describing information about modification or use of the ingredient) may include a reference to the portion of the metadata that has the ingredient metadata.

Illustrative Application of Creating Metadata During Object Development

The following specific illustrative embodiment is provided to illustrate some of the applications, uses, and benefits of metadata recorded during the development of an object.

Figure 1:
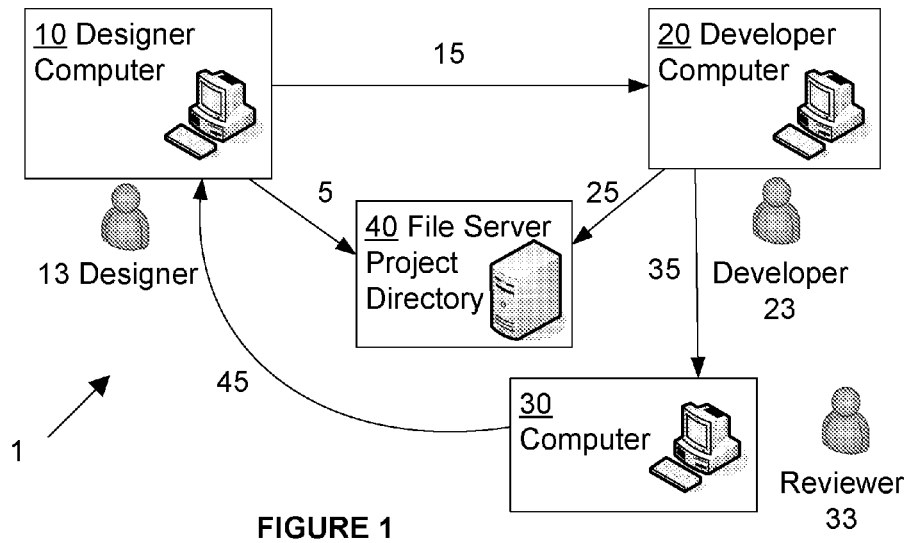
FIG. 1 is a flow diagram illustrating the creation and use of an object according to certain exemplary embodiments.

Referring now to the drawings in which like numerals indicate like elements throughout the several Figures, FIG. 1 is a flow diagram illustrating the creation of an object and related metadata according to certain exemplary embodiments. In this example a designer 13 and a developer 23 work together on an object development project for a reviewer 33. The designer 23 uses a computer 10 to graphically design a graphic for use in the object being developed. For example, a designer might use Adobe® Photoshop® to design the graphic. The designer 23 may then send a copy of the graphic 5 to a file server project directory 40 and a copy of the graphic 15 to the developer 20. Alternative techniques for sharing files during the object development process are of course possible. The copies 5, 15 may also have different formats from one another. For example, the copy 5 sent to the developer 23 may have a JPEG (compressed image) format while the copy 15 sent to the file server project directory 40 may have a PSD (Adobe® Photoshop® native) format.

After receiving the copy of the graphic 5 from the designer 13, the developer 23 may use a computer to incorporate or otherwise use the copy of the graphic 5 in an initial version of an object. For example, the developer 23 may use a development application to develop an object file that includes the graphic as the background for some or all of the object in the file. As a more specific example, a developer 23 may use an Adobe® Flash® development tool to develop an Adobe® Flash® movie (for publication in SWF format) that uses the copy of the graphic in some way. A copy of the object 25 developed by developer 23 may be sent to the file server project directory 40 and a copy of the object 35 may be sent to the reviewer 33. These copies 25, may have different formats. For example, the copy 35 sent to the reviewer 33 may have a SWF (Adobe® Flash® movie) format, while the copy 25 sent to the file server project directory 40 may have an Adobe® Flash® development tool source (un-compiled) format.

After receiving the copy of the object 35 from the developer 23, the reviewer 33 may view the object on a computer 23 and provide feedback to the designer 13 and/or the developer 23. For example, as shown in FIG. 1, the reviewer 33 may send a message to the designer 13 to fix something about the graphic that was used in the object 35. In response, the designer 13 must identify the identity of the graphic, the particular version of the graphic 5, 15, that was used. To do so, the designer may want to know more than simply the file's name, since different files may have the same name and even a file with a given name may have different versions.

In certain embodiments, metadata collected during development of an object is usable to easily identify ingredients of compound objects, such as the graphic 15 used in the object 35 of the FIG. 1 example. For example, a unique ingredient identifier may be created for the graphic 15. The unique identifier may be generated at any point during the development, including during the designer's work or the developer's work, at some other point of development, or may have been previously generated at an early point in time. For example, in certain embodiments, the developer's computer 23 includes an application that creates a unique ingredient identifier when an ingredient is received or otherwise imported into an object. For example, a unique ingredient identifier may be created when the developer 23 received the copy of the graphic 15 in an development tool. When the developer 23 includes the graphic, or a portion of the graphic, in the object 25, 35, metadata is created for the object file that comprises the unique ingredient identifier of the ingredient, i.e., the graphic 15, used in the object.

The inclusion of the unique ingredient identifier in the metadata of the object file 35, allows others to easily identify the exact ingredient used. Thus, in the example above, where the reviewer 33 sends a message 45 to the designer 13 to fix something about the graphic that was used in the object 35. The designer can use the metadata of the object 25, 35 to identify the exact graphic that was used. For example, an application on the computer 10 may parse the metadata, identify a unique ingredient identifier associated with the graphic, and use the unique ingredient identifier to locate the file that comprises the graphic.

In certain embodiments, metadata collected during development of an object is usable to easily identify how an ingredient is used in a compound object, for example, which portion of the graphic 15 was used in the object 35 and the information that the portion of the graphic 15 was used as the background for an opening segment of the object 35. For example, developer 23 may create a new document, import the graphic 15 received from the designer 13 into the document as a background, and then save the changed document.

In one embodiment, when the document is created, a document identifier and a first instance identifier are created. One or more metadata entries are generated and include these identifiers. Once the background is added, a second instance identifier is generated and one or more metadata entries are created that include the second instance identifier, the first instance identifier, and information about the change that was made, for example, identification that a background was added, the unique ingredient identifier of the graphic used as the background, and the date/time of the new version. In certain embodiments, metadata is created upon each change, in others it is created upon each document save, and in others it is created with reference to other events or time attributes. The development event, in this case inclusion of the graphic as an ingredient, need not relate to an ingredient. For example, the event could be a simple change in text or another ingredient appearing in the object.

The metadata of a compound object may include a pantry area that copies the original metadata of the object's ingredients. Thus, the graphic 15 could itself include embedded metadata that includes, as examples, a document identifier, an instance identifier, the designer's 13 name, the name of the application used to design the graphic, and other information related to the development of the graphic. Thus, as a graphic is manipulated within the object in which it is incorporated, the metadata of the object can include the graphic's original, unaltered metadata and metadata related to how the graphic is being used. In certain embodiments, a "pantry" area of the object's metadata is used to contain the original metadata of ingredients incorporated in the object.

These illustrative examples are given to introduce the reader to the general subject matter discussed herein and are not intended to limit the scope of the disclosed concepts. The following sections describe various additional embodiments and examples of methods and systems for using object and associated metadata.

Illustrative Network Configuration

Figure 2:
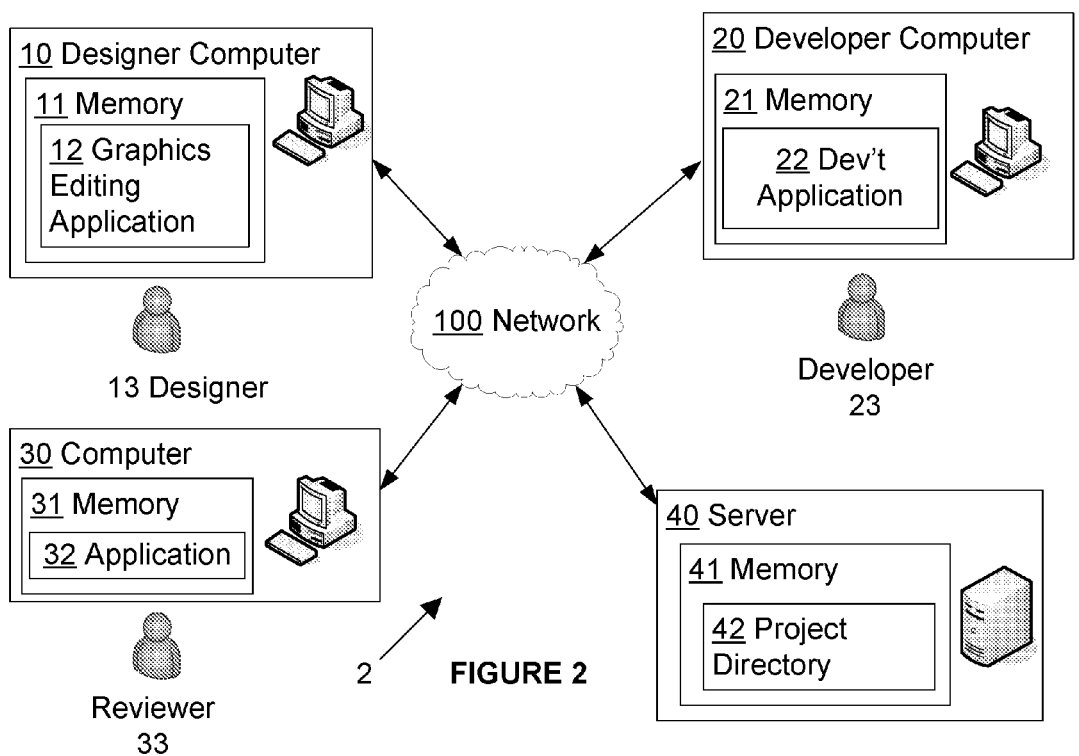
FIG. 2 is a system diagram illustrating an illustrative network environment according to certain embodiments.

FIG. 2 is a system diagram illustrating an illustrative network environment according to certain embodiments. For ease of understanding, the components of FIG. 1 are used to illustrate this exemplary environment. Other components and environments may be utilized. The environment 2 shown in FIG. 2 comprises a wired or wireless network 100 connecting various network devices 10, 20, 30, 40. Applications that execute on each of the devices 10, 20, 30, 40 are shown as functional or storage components residing in memory 11, 21, 31, 41 on the respective devices. As is known to one of skill in the art, such applications may be resident in any suitable computer-readable medium and execute on any suitable processor. For example, the network devices 10, 20, 30, 40 shown each may comprise a computer-readable medium such as a random access memory (RAM) 11, 21, 31, 41 coupled to a processor that executes computer-executable program instructions stored in memory 11, 21, 31, 41. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

The network 100 shown comprises the Internet. In other embodiments, other networks, such as an intranet, or no network may be used. Moreover, methods may operate within a single device. The devices 10, 20, 30, 40 can be connected to a network 100 as shown. Alternative configurations are of course possible. The devices 10, 20, 30, 40 may also comprise a number of external or internal devices such as a mouse, a CD-ROM, DVD, a keyboard, a display, or other input or output devices. Examples of devices that could execute an application 12, 22, 32 are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or object consuming programs.

The server devices 40 depicted as single computer systems, may be implemented as a network of computers or processors. Examples of a server device are servers, mainframe computers, networked computers, a processor-based device, and similar types of systems and devices.

In FIG. 2, a designer computer 10 comprises graphics editing application 12 in its memory 11 that may be used by a designer 13 to perform some or all of the development of an object. Similarly, a developer computer 20 comprises a development application 22 in its memory 21 that may be used by a developer 23 to perform some or all of the development of an object. A reviewer 33 may also participate in the development and/or use of an object being developed using an object viewing application 32 located in the memory 31 of a computer. Finally, a server 40 may be used to hold information about the development of the object, such as drafts and other files, in a central location accessible to those involved in the development of the object. The server 50 may comprise a project directory 42 in its memory 41 to store such information.

Illustrative Method of Creating Development Metadata

The present disclosure, among other things, provides various techniques for creating metadata. Certain embodiments involve tracking the developmental history of an object using unique identifiers. Such identifiers may be used for every version of the object and for every version of every ingredient incorporated or otherwise used in the object. In one embodiment every edit or change to an object is considered to create a new version of object to which a unique instance identifier is assigned. For each change, metadata is created that comprises the unique instance identifier and information about the change, as examples, the instance identifier of the prior version, the time of the change, and the software that was used to make the change. In cases where it is unknown exactly what changed, metadata may reflect as much as is known about the change, e.g., what part changed, what time range changed, etc. The result of recording metadata during development of an object is a collection of metadata that describes the history of an object's development. The uses for such metadata are numerous.

FIG. 3 is a flow chart illustrating a method of creating metadata according to certain embodiments. In the method shown in FIG. 3, an object development application is used by an object developer or designer to produce an object. At some point during the object development, the application receives a change to the object, as shown in block 310. The change can be anything, including but not limited to incorporating a graphic, sound, video, or other ingredient, identifying a data source for data to be included in the object, adding text, a shape, or other component to the object, changing attributes of the object, or its ingredient, and sending the object to a different development application for further development, among many other things.

In the method shown in FIG. 3, information about the change to the object is identified, as shown in block 320. In one embodiment, each time the user performs an action on an object development application, the application identifies what action the user has taken and prepares to record metadata about the action. In another embodiment, each time the user saves an object development file using an object development application, the application identifies what actions the user has taken since the last save and prepares to record metadata about the actions. The identification of metadata can, of course, be based on other events or timing schemes.

In the method shown in FIG. 3, metadata is created for the change to the object, as shown in block 330. The metadata comprises the information about the change. In certain embodiments, the information about the change to the object comprises a unique instance identifier identifying and unique to the changed version of the object. The information about the change to the object may include an identification of a unique instance identifier of a prior version of the object, the date/time of the change, identification of the software used to make the change. The information about the change may identify a particular ingredient of the object that was changed and/or how the item was changed, e.g., that the item with item identification number X (a square) was moved to the right by Y units (2 cm).

The metadata that is created may have any format and may or may not be metadata that is embedded within the object itself. Certain embodiments may utilize metadata created in accordance with the resource description framework (RDF) of the World Wide Web Consortium (W3C) specifications. Embodiments may utilize the Adobe® Extensible Metadata Platform (XMP). XMP defines a metadata model and is commonly serialized and stored as a subset of the RDF, which is in turn expressed in extensible markup language (XML). Common metadata tags recorded in XMP include things like title, description, creator, although the design is extensible, allowing users to add their own custom types of metadata.

The following is an example of metadata, using the XMP model, upon creation of an object according to certain embodiments:

```
<x:xmpmeta x:xmptk="Demo" xmlns:x="adobe:ns:meta/">
 <rdf:RDFxmlns:rdf="http://www.w3.org/1999/02/22-rdf-syntax-ns#"
      xmlns:xmpMM="http://ns.adobe.com/xap/1.0/mm/">
  <rdf:Description rdf:about="">
   <xmpMM:DocumentID>xmp.did:aed01537-1425-b034-
   d6035485</xmpMM:DocumentID>
   <xmpMM:OriginalDocumentID>xmp.did:aed01537-1425-b034-
      d6035485</xmpMM:OriginalDocumentID>
  </rdf:Description>
 </rdf:RDF>
</x:xmpmeta>
```

In this exemplary embodiment, additional metadata is created when the text "myexampletext" is added to the object:

```
<x:xmpmeta x:xmptk="Demo" xmlns:x="adobe:ns:meta/">
 <rdf:RDFxmlns:rdf="http://www.w3.org/1999/02/22-rdf-syntax-ns#"
      xmlns:xmpMM="http://ns.adobe.com/xap/1.0/mm/"
      xmlns:xmpDM="http://ns.adobe.com/xmp/1.0/
      DynamicObject/">
  <rdf:Description rdf:about="">
   <xmpMM:DocumentID>xmp.did:aed01537-1425-b034-
   d6035485</xmpMM:DocumentID>
   <xmpMM:OriginalDocumentID>xmp.did:aed01537-1425-b034-
      d6035485</xmpMM:OriginalDocumentID>
   <xmpDM:Speech rdf:parseType="Resource">
    <rdf:Seq>
     <rdf:li>
      <rdf:Description>
       <rdf:value>myexampletext</rdf:value>
       <xmpDM:start>0</xmpDM:start>
       <xmpDM:duration>1</xmpDM:duration>
       <xmpDM:probability>0.82</xmpDM:probability>
      </rdf:Description>
     </rdf:li>
    </rdf:Seq>
   </xmpDM:Speech>
  </rdf:Description>
```

```
  </rdf:RDF>
</x:xmpmeta>
```

These examples of changes to an object and metadata created to provide information about such changes are merely exemplary. Numerous modifications and alternatives are of course possible and will be understood by those of skill in the art.

Illustrative Method of Creating Development Metadata for Compound Objects

An object may be a compound object that includes one or more ingredients. In the method shown in FIG. 4, an object development application may be used by an object developer or designer to produce an object. At some point during the object development, the application identifies an ingredient of a compound object, as shown in block 410. The ingredient can be anything, including but not limited to a file containing a graphic, a file containing text, a file containing audio, a file containing a video, any other type of file, as well as content in a non-file format. The ingredient may be identified by a user action, such as a developer attempting to import a video file into a presentation object.

In the method of FIG. 4, an application creates metadata for the compound object, as shown in block 420. The metadata for the compound object comprises information about the inclusion of the ingredient in the compound object. The information about the inclusion of the ingredient in the compound object could, as examples, comprise a unique ingredient identifier and/or information about a modification of the ingredient performed by an object development application. A unique ingredient identifier for an ingredient may be unique to a particular ingredient, so that no other ingredient or potential ingredient has that identifier. In one embodiment, a unique ingredient identifier is derived from the ingredient itself. For example, if the ingredient is a file, the identifier could be generated from the data of the file.

In another embodiment, a unique ingredient identifier is based at least in part on an instance identifier found in metadata of the ingredient. For example, a photo being incorporated in a presentation object may already have metadata associated with it that uniquely identifies it. For example, as described with respect to FIG. 3, a unique instance identifier may be used to identify a different version of an object being developed. Thus, ingredients may themselves be objects that already have associated metadata.

The following is an example, using the XMP model, of how metadata may be changed with the inclusion of new metadata created upon inclusion of an ingredient in a compound object, according to certain embodiments. The original metadata is:

```
<x:xmpmeta x:xmptk="Demo" xmlns:x="adobe:ns:meta/">
 <rdf:RDF xmlns:rdf="http://www.w3.org/1999/02/22-rdf-syntax-ns#"
    xmlns:xmpMM="http://ns.adobe.com/xap/1.0/mm/">
  <rdf:Description rdf:about="">
   <xmpMM:DocumentID>xmp.did:acce1335-1223-ae32-
    d4015283</xmpMM:DocumentID>
   <xmpMM:OriginalDocumentID>xmp.did:acce1335-1223-ae32-
    d4015283</xmpMM:OriginalDocumentID>
  </rdf:Description>
 </rdf:RDF>
</x:xmpmeta>
```

In this exemplary embodiment, additional metadata is created when an ingredient (a movie file—"mymoviefile") is embedded as shown in the following modified metadata:

```
<x:xmpmeta x:xmptk="Demo" xmlns:x="adobe:ns:meta/">
 <rdf:RDF xmlns:rdf="http://www.w3.org/1999/02/22-rdf-syntax-ns#"
     xmlns:xmp="http://ns.adobe.com/xap/1.0/" xmlns:dc="http://www.purl.org/dc/elements/1.1/"
     xmlns:xmpMM="http://ns.adobe.com/xap/1.0/mm/"
     xmlns:stEvt="http://ns.adobe.com/xap/1.0/sType/ResourceEvent#">
  <rdf:Description rdf:about="">
   <xmpMM:DocumentID>xmp.did:acce1335-1223-ae32-d4015283</xmpMM:DocumentID>
   <dc:CreatorTool></dc:CreatorTool>
   <xmpMM:OriginalDocumentID>xmp.did:acce1335-1223-ae32-
      d4015283</xmpMM:OriginalDocumentID>
   <xmpMM:InstanceID>xmp.iid:adcf1436-1324-af33-d5025384</xmpMM:InstanceID>
   <xmpMM:History>
    <stEvt:event stEvt:action="created" stEvt:instanceID="xmp.iid:adcf1436-1324-af33-d5025384"
       stEvt:softwareAgent="Example Editor 1.0"/>
   </xmpMM:History>
   <xmpMM:Ingredient>
    <rdf:Bag>
      <rdf:li rdf:parseType="Resource">
       <stRef:instanceID
         xmlns:stRef="http://ns.adobe.com/xap/1.0/sType/ResourceRef#">xmp.iid:afd11638-1526-b135-
         d7045586</stRef:instanceID>
       <stRef:documentID
         xmlns:stRef="http://ns.adobe.com/xap/1.0/sType/ResourceRef#">xmp.did:aed01537-1425-b034-
         d6035485</stRef:documentID>
       <stRef:linkForm
         xmlns:stRef="http://ns.adobe.com/xap/1.0/sType/ResourceRef#">Embedded</stRef:linkForm>
       <stRef:linkCategory
         xmlns:stRef="http://ns.adobe.com/xap/1.0/sType/ResourceRef#">content</stRef:linkCategory>
       <stRef:URI stRef:lastModifyDate="2008-04-03T13:31:41-8:00"
         xmlns:stRef="http://ns.adobe.com/xap/1.0/sType/ResourceRef#">mymoviefile</stRef:URI>
      </rdf:li>
     </rdf:Bag>
    </xmpMM:Ingredient>
    <xmpMM:Pantry>
     <rdf:Bag>
      <rdf:li rdf:parseType="Resource">
```

-continued

```
    <xmpMM:DocumentID>xmp.did:acce1335-1223-ae32-d4015283</xmpMM:DocumentID>
    <dc:CreatorTool>Example Editor 1.0</dc:CreatorTool>
    <xmpMM:OriginalDocumentID>xmp.did:acce1335-1223-ae32-
        d4015283</xmpMM:OriginalDocumentID>
    <xmpMM:InstanceID>xmp.iid:adcf1436-1324-af33-d5025384</xmpMM:InstanceID>
    <xmpMM:History>
      <stEvt:event stEvt:action="created" stEvt:instanceID="xmp.iid:adcf1436-1324-af33-d5025384"
        stEvt:softwareAgent=""/>
    </xmpMM:History>
  </rdf:li>
  <rdf:li rdf:parseType="Resource">
    <xmp:MetadataDate>2008-04-03T13:31:41-8:00</xmp:MetadataDate>
    <dc:format>application/octet-stream</dc:format>
    <xmpMM:InstanceID>xmp.iid:afd11638-1526-b135-d7045586</xmpMM:InstanceID>
    <xmp:ModifyDate>2008-04-03T13:31:41-8:00</xmp:ModifyDate>
    <xmpMM:DocumentID>xmp.did:aed01537-1425-b034-d6035485</xmpMM:DocumentID>
    <dc:CreatorTool></dc:CreatorTool>
    <xmpMM:OriginalDocumentID>xmp.did:aed01537-1425-b034-
        d6035485</xmpMM:OriginalDocumentID>
    <xmpMM:History>
      <stEvt:event stEvt:action="derived" stEvt:instanceID="xmp.iid:afd11638-1526-b135-d7045586"
        stEvt:softwareAgent="" stEvt:when="2008-04-03T13:31:41-8:00" stEvt:changed=""/>
    </xmpMM:History>
    <xmpMM:DerivedFrom rdf:parseType="Resource">
      <stRef:instanceID
        xmlns:stRef="http://ns.adobe.com/xap/1.0/sType/ResourceRef#">xmp.iid:adcf1436-1324-af33-
        d5025384</stRef:instanceID>
      <stRef:documentID
        xmlns:stRef="http://ns.adobe.com/xap/1.0/sType/ResourceRef#">xmp.did:acce1335-1223-ae32-
        d4015283</stRef:documentID>
      <stRef:linkForm
        xmlns:stRef="http://ns.adobe.com/xap/1.0/sType/ResourceRef#">Derived</stRef:linkForm>
      <stRef:linkCategory
        xmlns:stRef="http://ns.adobe.com/xap/1.0/sType/ResourceRef#">Source</stRef:linkCategory>
    </xmpMM:DerivedFrom>
  </rdf:li>
 </rdf:Bag>
</xmpMM:Pantry>
</rdf:Description>
</rdf:RDF>
</x:xmpmeta>
```

In the above example, the instance identifier of the embedded movie file is "xmp.iid:afd11638-1526-b135-d7045586." This string is referenced in the object's metadata, to identify the embedded object. Note that the object's metadata also includes the embedded movie file's document identifier, "xmp.did:aed01537-1425-b034-d6035485."

As noted previously, an ingredient may itself have metadata associated with it. When an ingredient is used in a combined object, the metadata of the ingredient may also be changed to reflect such usage. For example, an entry could identify the combined object in which the ingredient has been embedded.

These illustrative examples are given to introduce the reader to the one embodiment and are not intended to limit the scope of the disclosed concepts. Numerous modifications and alternatives are of course possible and will be understood by those of skill in the art.

Illustrative Method of Creating Part Mapping Metadata for Compound Objects

When one or more ingredients are used in a compound object, information about how such ingredients are used may be valuable. Certain embodiments of the present disclosure involve a method of creating compound object metadata that includes a part mapping that identifies which part of an ingredient is used as which part of a compound object.

Figures 5, 6:
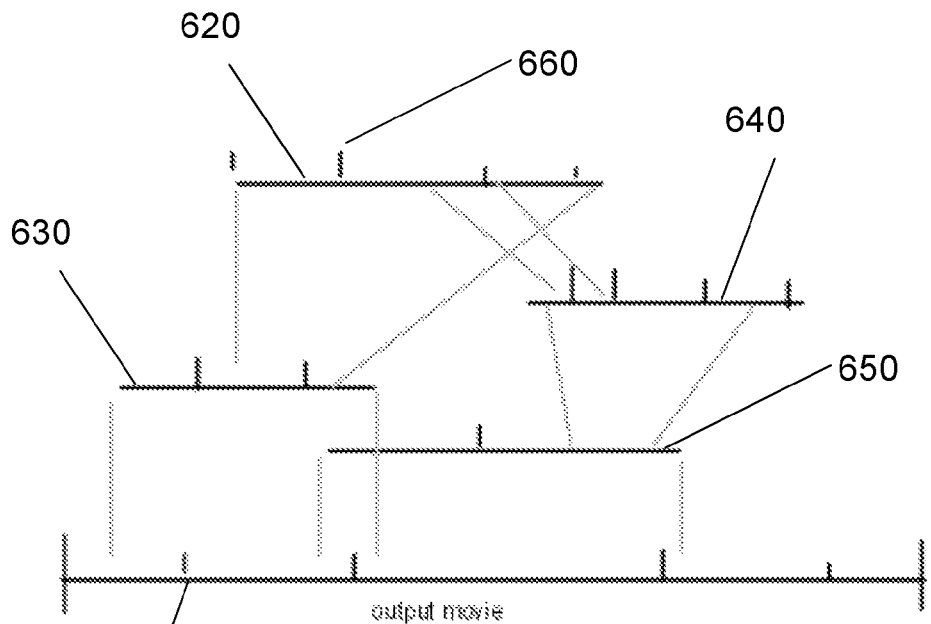
FIG. 5 is a flow chart illustrating a method of creating metadata that includes a part mapping according to certain embodiments.
FIG. 6 is an illustration of compositing layers/compositions together to compose an output movie according to certain embodiments.

FIG. 5 is a flow chart illustrating a method of creating metadata for a compound object according to certain embodiments. In the method shown in FIG. 5, an object development application is used by an object developer or designer to produce an object. At some point during the object development, the application identifies an ingredient of a compound object, as shown in block 510. The ingredient can be anything, including but not limited to a file containing a graphic, a file containing text, a file containing audio, a file containing a video, or any other type of file, as well as content in a non-file format. The ingredient may be identified by a user action, such as a developer importing a video file into a presentation object.

In the method shown in FIG. 5, an application determines a part mapping comprising an identification of a part of the ingredient used as a part of the compound object, as shown in block 520. For example, a slide presentation compound object may include a first photo on slide 5, a portion of a second photo on slide 6, audio during the first 10 seconds comprising the first 10 seconds of Ledwig van Beethovan's musical setting for Ode an die Freude ("Ode to Joy") from his ninth symphony, and the remainder of the music played during the last slide. These ingredients—the first photo, second photo, and file containing the Beethoven music—may be used during development of the presentation. As each of the ingredients is manipulated during development, for example as the portion of the second photo is selected, information about how the ingredients are used may be tracked. Such information may be used to construct a part mapping that specifies which portion of each ingredient is used in which portion of the combined object.

In the method shown in FIG. 5, part mapping metadata is created for a compound object, as shown in block 520. As an example, for each use of an ingredient, the metadata may record an entry that identifies the ingredient, the portion of the ingredient used, and the portion of the combined object file in which the portion of the ingredient appears. As illustrated in the preceding example, a portion of an ingredient can include the entire ingredient, i.e., all of the first photo is used on slide 5. A portion of an ingredient can also refer to a time-span portion of a temporal ingredient. In such cases, the part mapping for the ingredient may comprise an identification of a time-span of the ingredient used as well as the time portion of the combined object in which it is used.

FIG. 6 is an illustration of compositing layers/compositions together to compose an output movie 610 according to certain embodiments. In this example, a portion of layer 620 is used to form a portion of layer 630 and a portion of 620 is used to form a portion of layer 640. A portion of layer 640 is used to form a portion of layer 650. The output movie 610 is formed using layer 630 and layer 650. In short, the layer/compositions 620, 630, 640, and 650 used in the output movie are nested. A part mapping according to certain embodiments of the present disclosure can be included in the metadata of the output movie 610. Such a part mapping can describe the relationships amongst layers depicted in FIG. 6, among other things.

FIG. 6 also illustrates a directed acyclic graph (DAG) of ingredients. For example, ingredient 620 is used in 630 and 640, and both 630 & 640 are ultimately used in 610. Certain embodiments of the present invention provide a way to address these types of situations with respect to metadata, for example, so that metadata of 610 has only a single copy of the metadata from 620. In certain embodiments, metadata associated with any node of a DAG always has metadata of nested components promoted or otherwise moved to a top-level pantry area. In other words, for a given metadata representation of a node, there is a single pantry portion at the top-level. This is illustrated with the following of the metadata for a file X:

```
<static metadata e.g., for a copyright>
<temporal metadata, e.g., markers at points in time>
<ingredient list>
    For each ingredient:
        <part mapping (from part; to part)>
        <instance ID of ingredient>
<pantry>
```

List of Ingredients Indexed by Instanced ID, Used Either Directly by X, or Indirectly by Ingredients that X Uses Each ingredient listing in the pantry may have the same structure as the metadata for file X, i.e. it may be recursive, with the exception of the pantry itself, for which there is only the top-level one, i.e., the one for file X.

Figure 7:
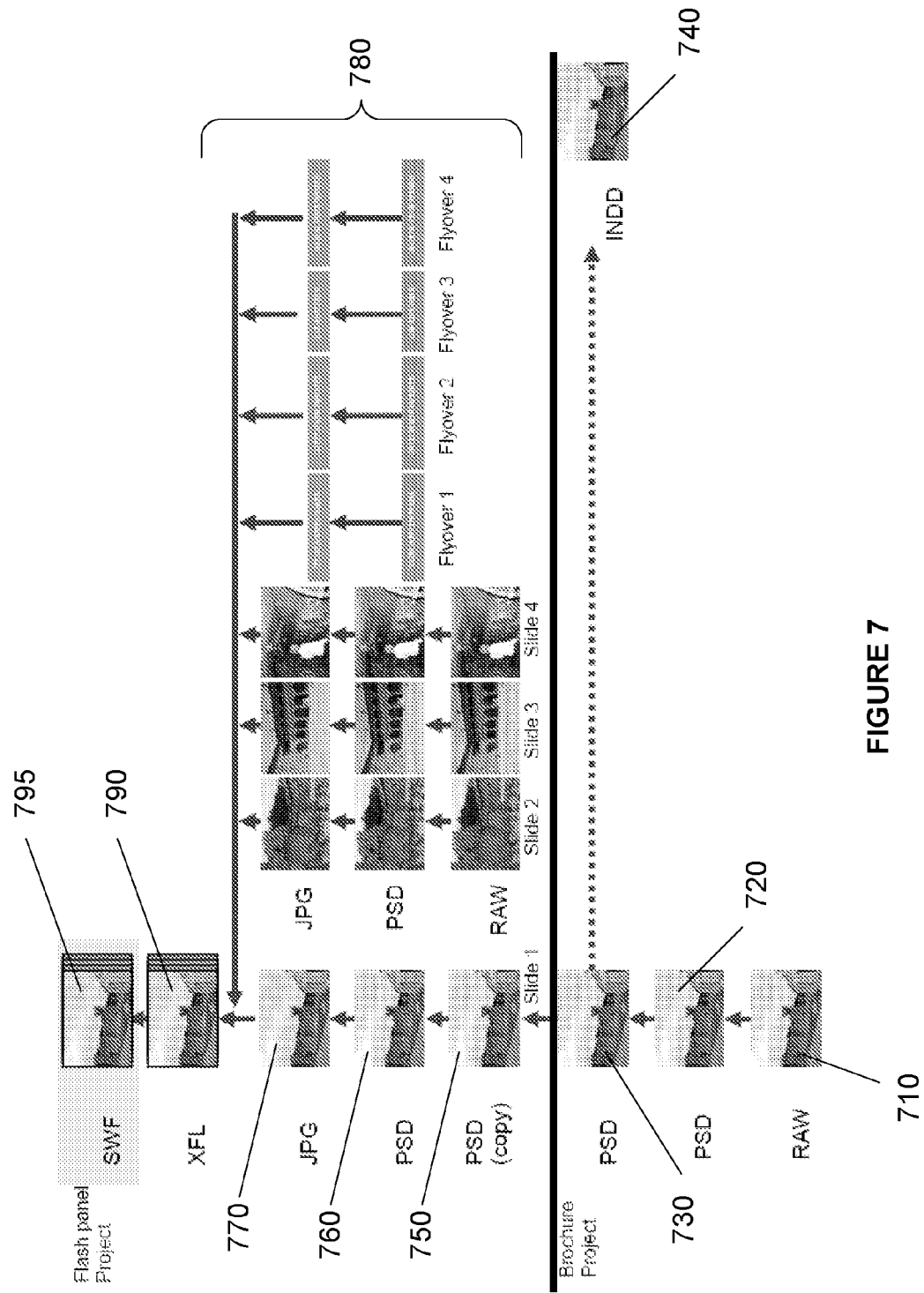
FIG. 7 is a flow diagram illustrating a development of an object according to certain embodiments.

FIG. 7 is a flow diagram illustrating development of an object according to certain embodiments. A brochure developer begins with a raw image for use in a brochure product. During development of the brochure, the raw image used in a PSD (Adobe® Photoshop® native) file 720, 730, which is imported in to Adobe® InDesign® desktop publishing software and used to generate an imported InDesign (.INDD) document, which is ultimately useful in producing the printed brochures. The PSD version of the brochure 730 is later used by a web developer, who makes a copy 750, makes any desired refinements 760, converts it to JPEG format 770, combines it with other content 780, and produces a flash development tool format (e.g., XFL) file which is ultimately used to produce a Flash video (e.g., a SWF file). Embodiments of the present disclosure may be used to track the development of the print and web products depicted in FIG. 6. For example, such metadata may be used to keep track of the identity of the raw image 710 and how parts 770, 780 are combined in a combined object 795, among other things.

Figure 8:
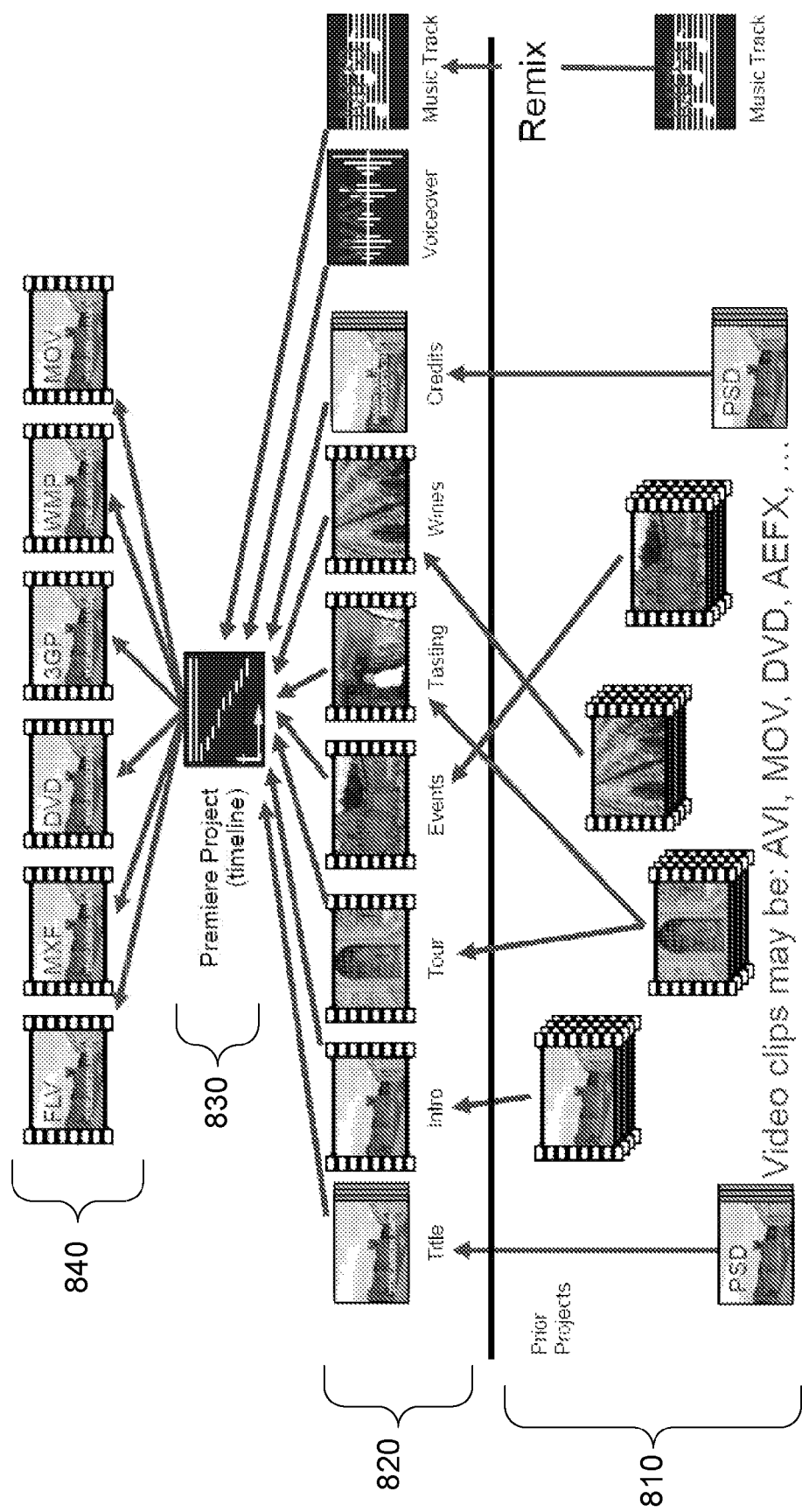
FIG. 8 is a flow diagram illustrating development of an object according to certain embodiments.

FIG. 8 is a flow diagram illustrating development of an object according to certain embodiments. In these embodiments, an object development project 820, 830, 840 pulls ingredients from a variety of different sources 810, selects portions 820 of these ingredients for inclusion, pulls the portions 820 together into one object 830 according to a specified timeline, and publishes the object in multiple formats 840. Certain embodiments create metadata based on the use of the ingredients. This metadata may be incorporated in the resulting published documents 840. As explained elsewhere herein, the metadata may also include source metadata pulled directly from one or more of the ingredients 810.

Figure 9:
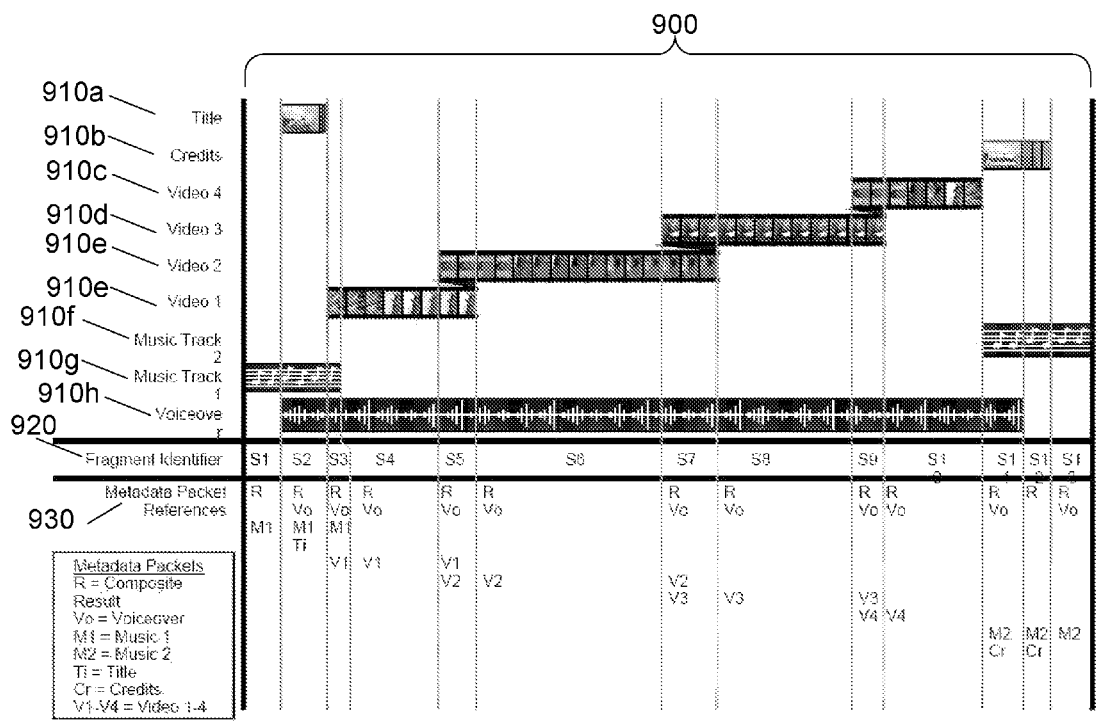
FIG. 9 is a chart illustrating ingredient use in a temporal object according to certain embodiments.
Figure 10:
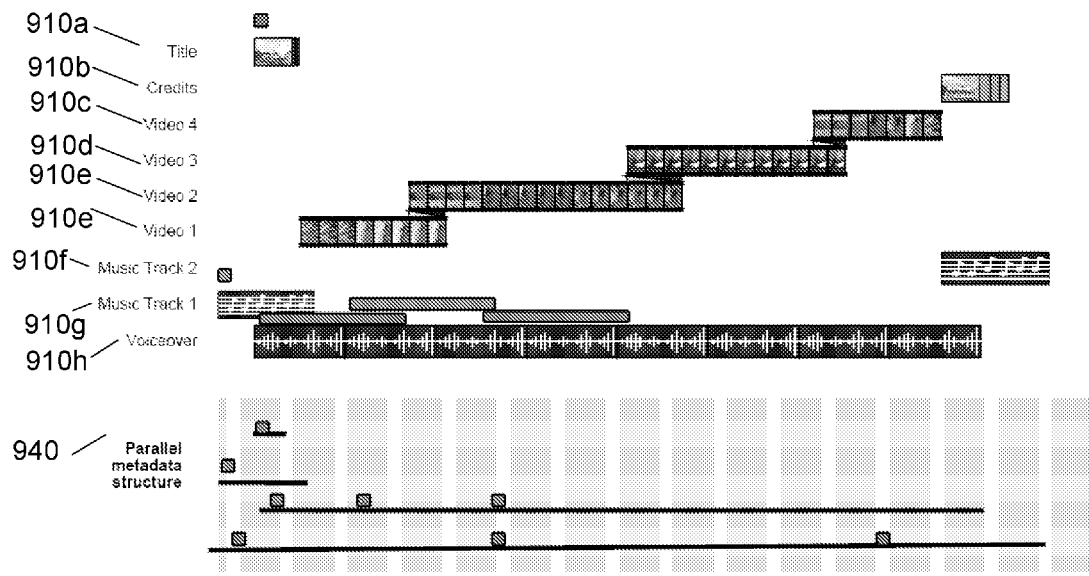
FIG. 10 is a chart illustrating ingredient use in a temporal object according to certain embodiments.

FIGS. 9-10 are charts illustrating ingredient use in a temporal object according to certain embodiments. The combined object 900 comprises an overlapping combination of the individual temporal ingredients 910a-h. Fragment identifier 930 identifies the discrete fragments of the object 900. Metadata packet reference 930 shows how metadata associated with each fragment can identify the ingredients 910a-h in the fragment, and thus provides a temporal part map for the object 900. A parallel metadata structure 940, illustrated in FIG. 10, shows that for those components that have metadata, the metadata can be maintained in a hierarchical structure that is parallel to (or at least similar to) the hierarchy of the timeline data, and optionally carried as if it was an additional track in the timeline.

Illustrative Method of Incorporating Ingredient Metadata in Metadata Created for Compound Objects FIG. 11 is a flow chart illustrating a method of creating metadata for a compound object during development of the compound object according to certain embodiments. At some point during the development of the compound object, an object development application identifies an ingredient of the compound object, as shown in block 1110. For example, a developer using the development application may identify a sound file to incorporate into an object being developed.

In the method shown in FIG. 11, metadata associated with the ingredient is identified, as shown in block 1120. For example, a graphic file and audio file may be used together in a combined object. Each ingredient—the graphic file and the audio file—may already have metadata embedded in its respective file. The graphic file may have information about its creation, author, date of creation and so on. Similarly, the audio file may have such source information and include a transcription of the words used in the audio file. For example, it may include actual lyrics of a song played in the audio file or the actual words of a speech spoken in the audio file. The respective metadata of these ingredients may be identified and captured by an object development tool being used to create the combined object.

In the method shown in FIG. 11, metadata is created for the compound object, as shown in block 1130. The metadata for the compound object comprises information about the inclusion of the ingredient in the compound object. For example, the information about the inclusion of the ingredient in the compound object may include information about a modification of the ingredient. The metadata for the compound object may further comprise information about the metadata associated with the ingredient. For example, it may include metadata that was embedded in the ingredient. Such information may be a copy of the metadata embedded in or otherwise previously associated with the ingredient.

The method may further comprise assigning a unique ingredient identifier to the ingredient. Such an identifier may be unique to and identify the ingredient. The information about the inclusion of the ingredient in the compound object may include the unique ingredient identifier. Similarly, the information about the metadata associated with the ingredient may comprise the unique ingredient identifier.

The metadata of a compound object may include a "pantry" area that acts as a bag for metadata copied from ingredients, among other things. The following is an example, using the XMP model, of how ingredient metadata may be embedded in the metadata of a combined object file, according to certain embodiments:

```
<rdf:RDF xmlns:rdf="http://www.w3.org/1999/02/22-rdf-syntax-ns#"
        xmlns:xmp="http://ns.adobe.com/xap/1.0/" xmlns:dc="http://www.purl.org/dc/elements/1.1/"
        xmlns:xmpMM="http://ns.adobe.com/xap/1.0/mm/"
        xmlns:stEvt="http://ns.adobe.com/xap/1.0/sType/ResourceEvent#">
  <rdf:Description rdf:about="">
   <xmpMM:DocumentID>xmp.did:acce1335-1223-ae32-d4015283</xmpMM:DocumentID>
   <dc:CreatorTool></dc:CreatorTool>
   <xmpMM:OriginalDocumentID>xmp.did:acce1335-1223-ae32-
        d4015283</xmpMM:OriginalDocumentID>
   <xmpMM:InstanceID>xmp.iid:adcf1436-1324-af33-d5025384</xmpMM:InstanceID>
   <xmpMM:History>
    <stEvt:event stEvt:action="created" stEvt:instanceID="xmp.iid:adcf1436-1324-af33-d5025384"
        stEvt:softwareAgent=""/>
   </xmpMM:History>
   <xmpMM:Ingredient>
    <rdf:Bag>
      <rdf:li rdf:parseType="Resource">
       <stRef:instanceID
        xmlns:stRef="http://ns.adobe.com/xap/1.0/sType/ResourceRef#">xmp.iid:afd11638-1526-b135-
        d7045586</stRef:instanceID>
       <stRef:documentID
        xmlns:stRef="http://ns.adobe.com/xap/1.0/sType/ResourceRef#">xmp.did:aed01537-1425-b034-
        d6035485</stRef:documentID>
       <stRef:linkForm xmlns:stRef="http://ns.adobe.com/xap/1.0/sType/ResourceRef#">Fully
        Embedded</stRef:linkForm>
       <stRef:linkCategory
        xmlns:stRef="http://ns.adobe.com/xap/1.0/sType/ResourceRef#">content</stRef:linkCategory>
       <stRef:URI stRef:lastModifyDate="2008-04-03T17:00:37-8:00"
        xmlns:stRef="http://ns.adobe.com/xap/1.0/sType/ResourceRef#">myembeddedingredient</stRef:
        URI>
      </rdf:li>
    </rdf:Bag>
   </xmpMM:Ingredient>
   <xmpMM:Pantry>
    <rdf:Bag>
      <rdf:li rdf:parseType="Resource">
       <xmp:MetadataDate/>
       <dc:format/>
       <xmpMM:DocumentID>xmp.did:acce1335-1223-ae32-d4015283</xmpMM:DocumentID>
       <dc:CreatorTool></dc:CreatorTool>
       <xmpMM:OriginalDocumentID>xmp.did:acce1335-1223-ae32-
        d4015283</xmpMM:OriginalDocumentID>
       <xmpMM:InstanceID>xmp.iid:adcf1436-1324-af33-d5025384</xmpMM:InstanceID>
       <xmpMM:History>
         <stEvt:event stEvt:action="created" stEvt:instanceID="xmp.iid:adcf1436-1324-af33-d5025384"
          stEvt:softwareAgent=""/>
       </xmpMM:History>
      </rdf:li>
      <rdf:li rdf:parseType="Resource">
       <xmp:MetadataDate>2008-04-03T17:00:37-8:00</xmp:MetadataDate>
       <dc:format>application/octet-stream</dc:format>
       <xmpMM:InstanceID>xmp.iid:afd11638-1526-b135-d7045586</xmpMM:InstanceID>
       <xmp:ModifyDate>2008-04-03T17:00:37-8:00</xmp:ModifyDate>
       <xmpMM:DocumentID>xmp.did:aed01537-1425-b034-d6035485</xmpMM:DocumentID>
       <dc:CreatorTool></dc:CreatorTool>
       <xmpMM:OriginalDocumentID>xmp.did:aed01537-1425-b034-
         d6035485</xmpMM:OriginalDocumentID>
       <xmpMM:History>
        <stEvt:event stEvt:action="derived" stEvt:instanceID="xmp.iid:afd11638-1526-b135-d7045586"
         stEvt:softwareAgent="" stEvt:when="2008-04-03T17:00:37-8:00" stEvt:changed=""/>
       </xmpMM:History>
       <xmpMM:DerivedFrom rdf:parseType="Resource">
         <stRef:instanceID
          xmlns:stRef="http://ns.adobe.com/xap/1.0/sType/ResourceRef#">xmp.iid:adcf1436-1324-af33-
          d5025384</stRef:instanceID>
         <stRef:documentID
          xmlns:stRef="http://ns.adobe.com/xap/1.0/sType/ResourceRef#">xmp.did:acce1335-1223-ae32-
          d4015283</stRef:documentID>
```

```
    <stRef:linkForm
      xmlns:stRef="http://ns.adobe.com/xap/1.0/sType/ResourceRef#">Derived</stRef:linkForm>
    <stRef:linkCategory
      xmlns:stRef="http://ns.adobe.com/xap/1.0/sType/ResourceRef#">Source</stRef:linkCategory>
    </xmpMM:DerivedFrom>
   </rdf:li>
  </rdf:Bag>
 </xmpMM:Pantry>
</rdf:Description>
</rdf:RDF>
</x:xmpmeta>
```

This example of a "pantry" area within metadata is merely exemplary. Numerous modifications and alternatives are of course possible and will be understood by those of skill in the art.

As described previously, FIG. 6 is an illustration of compositing layers/compositions together to compose an output movie 610 according to certain embodiments. In the case of temporal object, each layer 620, 630, 640, 650 has a time span. A layer that is used as an ingredient may itself have embedded metadata that relates to its specific time span. For example, the metadata may include a marker that identifies the moment in time when a particular character enters a scene. That marker may reference the time position in the original file. For example, layer 620 may include a marker 660 that identifies a particular point in time within the layer 620, e.g., 10 seconds into layer 620.

As output movie 640 is developed and the various layers are combined, the ingredient metadata may be passed down or otherwise nested at each step. This allows the full structure of the original information to be retained and traversed, even though the rendering process may have "flattened" the information. The object development application (or any other application that uses the object) may be enabled to traverse (iterating over) metadata by essentially walking through the graph of composition inclusions. For example, data may be represented by having an ingredient list for each ingredient which lists other ingredients or objects referenced. The top level metadata of the entire movie, for example a pantry element may be used to contain all of the metadata for all of the ingredients.

An example of the preceding discussion is a marker identifying when a car starts in video clip. When that clip is put in a highlights reel for another movie, the metadata of the clip travels with it and allows anyone with access to the movie's metadata sufficient information to dig out the marker and identify to what point in the clip it references.

Illustrative Method of Creating Metadata for a Compound Object that Includes a Modified Ingredient FIG. 12 is a flow chart illustrating a method of creating metadata for a compound object that includes a modified ingredient, according to certain embodiments. At some point during the development of the compound object, an object development application identifies an ingredient of the compound object, as shown in block 1210. For example, a developer using the development application may identify a sound file to incorporate into an object being developed.

In the method of FIG. 12, a unique ingredient identifier is created for the ingredient, as shown in block 1220. For example, the unique ingredient identifier could be captured from the ingredient's own metadata. As another example, the unique ingredient identifier could be generated using an algorithm that generates a number based on the data of the ingredient file.

In the method of FIG. 12, a modification of the ingredient is received, as shown in block 1230. Thus, a modification to the ingredient is desired for the compound object. For example, an audio segment may be edited to include silence or voiceover of explicit language.

In the method of FIG. 12, compound object metadata is created that comprises (I) information about the modification of the ingredient and (II) information about the metadata associated with the ingredient, as shown in block 1230. The unique ingredient identifier is included as part of both the information about the modification and the information about the metadata associated with the ingredient. For example, the metadata may include metadata entries that identify that certain timespans of an audio segment have been voiced-over and metadata entries that include metadata from the original audio, e.g., metadata that includes text of the words of the original audio (including the voiced-over words).

General

Certain embodiments relate to creating metadata for objects as the objects are being developed and for compound objects. These are merely illustrative. For example, certain embodiments will not involve compound objects. Certain embodiments will not involve incorporating metadata about ingredients. Certain embodiments will not involve the use of a unique ingredient or instance identifier. In short, the techniques and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

That which is claimed:

1. A method of creating metadata, the method comprising:
generating, by a computer, a compound object and metadata for the compound object during development of the compound object, wherein the compound object is an electronic file that comprises a plurality of ingredients, wherein each ingredient is an electronic content file, and wherein the metadata of the compound object describes relationships of the plurality of ingredients relative to the compound object;

identifying, by the computer, an ingredient of the compound object and metadata of the ingredient;

adding, by the computer, to the metadata of the compound object:
- a description of usage of the ingredient relative to a version of the compound object, wherein the description identifies the ingredient, a portion of the ingredient used in the compound object, and a portion of the compound object in which the portion of the ingredient is used,
- the metadata of the ingredient, wherein the metadata of the ingredient comprises an instance identifier that identifies a version of the ingredient used with the version of the compound object, and
- a unique ingredient identifier that identifies the ingredient, wherein the unique ingredient identifier is based on the instance identifier;

receiving, by the computer, a change to the compound object during the development of the compound object, the change resulting in a changed version of the compound object and a modification to the usage of the ingredient relative to the compound object;

determining, by the computer, an instance identifier that identifies the changed version of the compound object; and adding, by the computer to the metadata of the compound object, information about the change to the compound object, information about the modification to the usage of the ingredient relative to the compound object, and the instance identifier specific to the changed version of the compound object.

2. The method of claim 1, wherein the information about the change to the compound object comprises the time of the change to the compound object.

3. The method of claim 1 wherein the change comprises sending the object to another different application to make the change, wherein the information about the change to the compound object further comprises an identification of the different application used to make the change.

4. The method of claim 1 wherein the change comprises adding text to the compound object.

5. The method of claim 1 wherein the change comprises changing an attribute of the compound object.

6. The method of claim 1 wherein the information about the change to the compound object further identifies an action taken by a user.

7. The method of claim 1 wherein the information about the change to the compound object further identifies actions taken by a user since a last save of the compound object.

8. A method of creating metadata for a compound object, the method comprising:

generating, by a computer, a compound object and metadata for the compound object, wherein the compound object is an electronic file that comprises a plurality of ingredients, wherein each ingredient is an electronic content file, and wherein the metadata of the compound object describes relationships of the plurality of ingredients relative to the compound object;

adding, by the computer, an ingredient to the compound object, wherein the ingredient is an electronic content file;

identifying, by the computer, metadata of the ingredient;

adding, at the computer, to the metadata of the compound object:
- a description of usage of the ingredient relative to a version of the compound object, wherein the description identifies the ingredient, a portion of the ingredient used in the compound object, and a portion of the compound object in which the portion of the ingredient is used,
- the metadata of the ingredient, wherein the metadata of the ingredient comprises an instance identifier that identifies a version of the ingredient used with the version of the compound object, and
- a unique identifier that identifies the ingredient, wherein the unique identifier is based on the instance identifier;

identifying, by the computer, a change to the usage of the ingredient relative to the compound object; and adding, by the computer to the metadata of the compound object, a description about the change and an instance identifier specific to the change to the metadata of the compound object.

9. The method of claim 8, wherein the unique identifier is derived from the ingredient.

10. The method of claim 8, wherein the unique identifier is based on an instance identifier about the ingredient being generated found in metadata of the ingredient.

11. The method of claim 8, wherein the unique identifier of the ingredient, the metadata of the ingredient, the description of the ingredient relative to the version of the compound object, and the instance identifier that identifies the version of the ingredient are added to an entry of the metadata of the compound object, and wherein adding the description about the change and the instance identifier specific to the change to the metadata of the compound object comprises:

creating a different entry in the metadata of the compound object; and adding, to the different entry without changing information in the entry, the description about the change and the instance identifier specific to the change to the metadata of the compound object.

12. The method of claim 8, wherein the unique identifier of the ingredient is generated based on a function applied to the metadata of the ingredient.

13. The method of claim 8, further comprising: updating the metadata of the ingredient based on an addition of the ingredient to the compound object, wherein the metadata of the ingredient comprises the description about the usage of ingredient relative to the compound object.

14. The method of claim 8, wherein the metadata of the compound object comprises a description of the compound object and an instance identifier specific to the compound object being generated.

15. The method of claim 8, wherein the metadata of the object comprises a first portion and a second portion, wherein the first portion stores the metadata of the ingredient, and wherein the second portion is different from the first portion, stores the information about the modification to the usage of the ingredient, and stores a reference to the first portion of the metadata of the object.

16. A method of creating metadata for a compound object, the method comprising:

identifying, by a computer, an ingredient of a compound object, wherein the compound object is an electronic file that comprises a plurality of ingredients, wherein each ingredient is an electronic content file, and wherein the metadata of the compound object describes relationships of the plurality of ingredients relative to the compound object;

identifying, by the computer, metadata associated with the ingredient, wherein the metadata associated with the ingredient comprises an instance identifier that identifies a version of the ingredient used with a version of the compound object;

assigning, by the computer, a unique ingredient identifier that identifies the ingredient, wherein the unique ingredient identifier is based on the instance identifier;

creating, by the computer, metadata for the compound object, the metadata for the compound object comprising:

information about usage of the ingredient relative the version of the compound object, wherein the information identifies the ingredient, a portion of the ingredient used in the compound object, and a portion of the compound object in which the portion of the ingredient is used, the unique ingredient identifier, and the metadata associated with the ingredient;

detecting, by the computer, a modification of the ingredient; and updating, by the computer, the metadata of the object based on the modification, wherein the updating comprises adding to the metadata of the compound object information about the modification of the ingredient and an instance identifier specific to modification of the object.

17. The method of claim 16, wherein the information about the metadata associated with the ingredient comprises the unique ingredient identifier.

18. The method of claim 16, wherein the information about the metadata associated with the ingredient comprises a copy of the metadata associated with the ingredient.

19. A method of creating metadata, the method comprising:

identifying, by a computer, ingredient metadata associated with an ingredient for use in a compound object during development of the compound object, wherein the compound object is an electronic file that comprises a plurality of ingredients, wherein each ingredient is an electronic content file, wherein the ingredient metadata comprises an instance identifier that identifies a version of the ingredient used with a version of the compound object, and wherein metadata of the compound object describes relationships of the plurality of ingredients relative to the compound object;

creating, by the computer, a unique ingredient identifier for the ingredient based on the instance identifier from the ingredient metadata;

adding, by the computer, to the metadata of the compound object:

the unique ingredient identifier, the ingredient metadata, a description of usage of the ingredient relative to the version of the compound object, wherein the description identifies the ingredient, a portion of the ingredient used in the compound object, and a portion of the compound object in which the portion of the ingredient is used, and the instance identifier that identifies the version of the ingredient;

receiving, by the computer, a modification of the ingredient as used in the compound object;

generating, by the computer, an instance identifier specific to the modification; and updating, by the computer, the metadata of the compound object based on the modification, the updating comprising adding information about the modification and the instance identifier specific to the modification to the metadata of the compound object.

20. A non-transitory computer-readable medium on which is encoded program code that, when executed on a computing system, configures the computing system to perform operations comprising:

generating a compound object and metadata for the compound object during development of the compound object, wherein the compound object is an electronic file that comprises a plurality of ingredients, wherein each ingredient is an electronic content file, and wherein the metadata of the compound object describes relationships of the plurality of ingredients relative to the compound object;

identifying an ingredient of the compound object and metadata of the ingredient;

adding to the metadata of the compound object:

a description of usage of the ingredient relative to a version of the compound object, wherein the description identifies the ingredient, a portion of the ingredient used in the compound object, and a portion of the compound object in which the portion of the ingredient is used, the metadata of the ingredient, wherein the metadata of the ingredient comprises an instance identifier that identifies a version of the ingredient used with the version of the compound object, and a unique ingredient identifier that identifies the ingredient, wherein the unique ingredient identifier is based on the instance identifier;

receiving a change to the compound object during the development of the compound object, the change resulting in a changed version of the compound object and a modification to the sage of the ingredient relative to the compound object;

determining an instance identifier that identifies the changed version of the compound object; and adding, by the computer to the metadata of the compound object, information about the change to the compound object, information about the modification to the usage of the ingredient relative to the compound object, and the instance identifier specific to the changed version of the compound object.

21. A non-transitory computer-readable medium on which is encoded program code that, when executed on a computing system, configures the computing system to perform operations comprising:

identifying an ingredient of a compound object, wherein the compound object is an electronic file that comprises a plurality of ingredients, wherein each ingredient is an electronic content file, wherein the ingredient embeds metadata about respective electronic content, and wherein the metadata of the ingredient comprises an instance identifier that identifies a version of the ingredient used with a version of the compound object;

assigning a unique ingredient identifier to the ingredient based on the instance identifier from the metadata of the ingredient;

creating metadata for the compound object, the metadata for the compound object comprising:

a description of relationships of the plurality of ingredients relative to the compound object, the unique ingredient identifier, the metadata of the ingredient, a description of usage of the ingredient relative to the version of the compound object, wherein the description identifies the ingredient, a portion of the ingredient used in the compound object, and a portion of the compound object in which the portion of the ingredient is used, and the instance identifier that identifies the version of the ingredient;

receiving a modification of the ingredient as used in the compound object;

generating an instance identifier specific to the modification; and updating the metadata of the compound object based on the modification, the updating comprising adding information about the modification and the instance identifier specific to the modification to the metadata of the compound object.

* * * * *